United States Patent [19]

Jacobs

[11] Patent Number: 5,681,417
[45] Date of Patent: Oct. 28, 1997

[54] METHOD AND DEVICE FOR STRIPPING OPTICAL FIBRE RIBBONS

[75] Inventor: Johan Frederik Jacobs, Rijnsburg, Netherlands

[73] Assignee: Koninklijke PTT Nederland N.V., Groningen, Netherlands

[21] Appl. No.: 424,815

[22] Filed: Apr. 19, 1995

[30] Foreign Application Priority Data

Apr. 27, 1994 [NL] Netherlands ............... 9400678

[51] Int. Cl.$^6$ ............................................. B32B 35/00
[52] U.S. Cl. ........................ 156/344; 156/584; 81/9.4; 81/9.42; 81/9.51; 7/107; 29/564.4; 30/90.1; 118/404
[58] Field of Search ........................ 156/344, 584; 81/9.4, 9.41, 9.42, 9.44, 9.51; 7/107; 29/564.4, 566.4; 30/90.1; 118/56, 125, 404

[56] References Cited

U.S. PATENT DOCUMENTS

| | | | |
|---|---|---|---|
| 5,298,105 | 3/1994 | Dorsey | 156/344 X |
| 5,323,475 | 6/1994 | Marsden et al. | 385/77 |
| 5,481,638 | 1/1996 | Roll et al. | 81/9.4 X |

FOREIGN PATENT DOCUMENTS

| | | |
|---|---|---|
| 0190519 | 8/1986 | European Pat. Off. |
| 0540238 | 5/1993 | European Pat. Off. |
| 2551557 | 3/1985 | France |
| 4203995 | 8/1993 | Germany |
| 4227041 | 2/1994 | Germany |
| 58-028703 | 2/1983 | Japan |
| 1057204 | 3/1989 | Japan |
| 1147503 | 6/1989 | Japan |

OTHER PUBLICATIONS

Enatechnik, "FSM–20RS$_8$/FSM–20RS$_{12}$", 3 pages.
O.S. Gebizlioglu et al., "Self–stripping of optical fiber coatings in hydrocarbon liquids and cable filling compounds", *Optical Engineering*, vol. 30, No. 6, Jun. 1991, pp. 749–762.

*Primary Examiner*—Mark A. Osele
*Attorney, Agent, or Firm*—Michaelson & Wallace; Peter L. Michaelson; John C. Pokotylo

[57] ABSTRACT

For removing coating material from an end (5) of a fiber ribbon (1) over a length L, while using a chemical softening agent, the end is received and clamped between clamping parts (9, 35) of a holder. The clamping parts form a casing wall of a space in which the fiber ribbon with the end extends inwardly over said length L. Softening agent is supplied into the space via a supply opening (47), and brought into contact with coating material of the end, preferably via a layer of material (49) soakable for the softening agent. Adjacent to the point where the end extends inwardly through the wall formed by the clamping parts, scoring knives (33, 43) are mounted for scoring the coating material. One of the clamping parts is provided with an exhaust opening (51) for exhausting surplus softening agent. After softening the fiber ribbon (1) is withdrawn, with the end clamped, from holder (9).

7 Claims, 3 Drawing Sheets

METHOD AND DEVICE FOR STRIPPING OPTICAL FIBRE RIBBONS

BACKGROUND OF THE INVENTION

1. Field of the Invention

The present invention concerns optical fiber ribbon technology. More particularly, it refers to a method and device for removing coating material from a fiber ribbon end.

2. Related Art

Optical fiber cables are more and more constructed as fiber ribbon cables, in which often large numbers of fibers are no longer incorporated separately, but for example, are parallelly arranged with eight or sixteen fibers in ribbon-shaped structures of coating material, the so-called fiber ribbons. The fiber connecting techniques are also attuned to this by no longer carrying out connecting processes such as the fusion-weld process fiber, but per fiber ribbon. For this purpose, the coating material has to be removed from the fiber ribbon ends. The removal of the coating material from an end of a fiber ribbon will hereinafter also be referred to as stripping a fiber ribbon end. Patent Abstracts of Japan, Vol. 13, No. 263 (Jun. 19, 1989) and JP-A-105 72 04 to Mitsubishi Cable Ind. Ltd. (Mar. 3, 1989) (collectively referred to as "the Mitsubishi reference") discloses a method and device for removing coating layers, i.e., the coating of the ribbon and the coating of the fibers in the ribbon, from a fiber ribbon end. In that connection, a fiber ribbon end, of which the coating layers have to be removed, is clamped into two holders coupled by means of guiding bars. The holders can be mutually displaced longitudinally of the ribbon via the guiding bars. Between the holders, one of the holders is provided with knife blades. The knife blades are arranged and adjusted such that, when clamping, the coating layers of a ribbon are scored over the entire width on the upper and under side to (nearly, but not entirely) the (cladding of the) fibers. By then mutually pushing the holders away from the score, the fibers of the ribbon end are pulled out of the clamped coating layers. This known stripping technique only works well when the fiber coating is fairly loose or at least only slightly adhered around the fibers. If this is not the case, large forces are necessary to pull the fibers out of the fiber coating, increasing the chance of fiber rupture. As a consequence of upsetting the coating material, the fiber ends can moreover spread in such a manner that welding operations in the ribbon weld apparatus are impeded.

An improvement of this stripping technique is disclosed in Patent Abstracts of Japan, Vol. 13, No. 406 (Sep. 8, 1989) and JP-A-1147503 to Sumitomo Electric Ind. Ltd. & NTT (Sep. 6, 1989) (collectively referred to as "the Sumitomo reference"). Here, the holder, into which the part of the ribbon end to be stripped is clamped, is provided with a heating element. With this, the coating layers to be removed are first heated for a certain period of time, as a result of which the coating material softens, before the holders are mutually moved away. Both the softening temperature of especially the fiber coating material and the duration of the heating can be critical under certain circumstances and be fairly divergent for different coating materials. The heating element in such cases requires a very accurate setting of the temperature and of the heating time. Another problem occurs when fiber connections have to be produced between fibers of two conventional fiber cables or of a conventional fiber cable and a ribbon fiber cable. As welding ribbon-wise can be carried out more speedily, it can be preferable to first form the loose fibers of each conventional cable into fiber ribbons, then to remove the coating thereof, and only then to carry out the welding. In fiber cables several years old, the coating material can show aging phenomena. Such aging can manifest itself in a hardening of the coating material, which hinders a thermal softening, and sometimes in a larger adhering of the coating material to the actual fiber. In either case, the ribbon-wise stripping with the prior-art techniques is consequently impeded.

As with mechanically stripping, whether or not preceded by thermal softening, in some places often rests of coating material remain it is the custom to clean the stripped end with a cleaning agent. For this purpose, usually volatile liquids of hydrocarbon compounds such as acetone and dichloromethane are used. As is disclosed, in for example the paper, O. S. Gebizlioglu and I. M. Plitz, "Self Stripping of Optical Fiber Coating in Hydrocarbon Liquids and Cable Filling Compounds", *Optical Engineering*, Vol. 30, No. 6, pp. 749–762 (June 1991) (referred to as "the Gebizlioglu paper"), such liquids soften the coating material and reduce the degree of adherence to the cladding material of the fiber. Therefore, they can also be used with chemically stripping single fibers. Thus, European Patent Publication EP-A-0190519 and French Patent Publication FR-A-2551557, for example, disclose stripping tools with which a single fiber to be stripped must be inserted, through an opening in a membrane or between two jawlike elements, into a reservoir containing such a coating material softening liquid, and must be retracted after softening. In this connection, the softened and normally also swollen coating material is retained by the membrane or jawlike elements respectively. These known stripping tools for chemically stripping a single fiber are not, or at least not immediately suitable for stripping fiber ribbons. Furthermore, the coating material removed remains in the reservoir of the softening liquid, and can only be removed therefrom with the liquid. Consequently, contamination of the softening liquid can occur and the reservoir can become blocked with rests of coating material (i.e., coating material left behind).

An advantage of stripping chemically with a softening liquid is that, without much effort, the coating material can often be pushed off the fiber as a loose sleeve.

SUMMARY OF THE INVENTION

The object of the invention is to provide a method and a device for removing coating material from a fiber ribbon end while using a chemical softening agent, and with which the above-mentioned problems do not occur. A method for removing coating material from a fiber ribbon end, over a predetermined length includes steps of:

receiving and clamping said fiber ribbon end into a holder, scoring the coating material on the upper and under side of the fiber ribbon at a point corresponding to the length, softening the coating material of the fiber ribbon end over the length by means of a chemical softening agent, withdrawing the fiber ribbon the holder, with the fiber ribbon end clamped, while the softened coating material of the end remains in the holder, is in accordance with the invention. The end is received and clamped into a recessed space between two clamping parts forming part of the holder which together form a casing wall around the received end, and the softening agent is supplied into the recessed space, with the end received and clamped, through a supply opening in the wall and is brought into contact with the coating material of the fiber ribbon end. To prevent the softening agent from also attacking the coating material beyond the scoring point, in a preferred embodiment of the invention, the method further comprises a step of exhausting surplus swelling liquid adjacent to the point where the fiber ribbon is scored.

In a further preferred embodiment of the invention, the softening agent is a liquid which is at least partly brought into contact with the coating material of the fiber ribbon end via a layer of material soakable for the liquid.

In another preferred embodiment, the softening agent is a liquid which is at least partly brought into contact with the coating material of the fiber ribbon end by capillary attraction between surfaces of the clamping parts of the second holder and the surface of the fiber ribbon end which is clamped between the clamping parts.

A device for removing coating material from a fiber ribbon end includes:

a first holder for receiving and clamping a substantially flat fiber ribbon end over a predetermined length of the fiber ribbon, and scoring means mounted on the first holder for scoring the coating material on the flat upper and under side of a clamped fiber ribbon at a point corresponding to the length, wherein the first holder includes means for supplying and bringing into contact the coating material of the fiber ribbon end with a chemical softening agent.

In a preferred embodiment, the device of the invention is provided with means for exhausting surplus softening agent.

REFERENCES

[1] Patents Abstracts of Japan, vol. 13, no. 263, Jun. 19, 1989; & JP-A-1057204 (Mitsubishi Cable Ind Ltd) Mar. 3, 1989;

[2] Patents Abstracts of Japan, vol. 13, no. 406, Sep. 8, 1989; & JP-A-1147503 (Sumitomo Electric Ind. Ltd. & NTT) Jun. 9, 1989;

[3] O. S. Gebizlioglu and I. M. Plitz: "Self-stripping of optical fiber coatings in hydrocarbon liquids and cable filling compounds", Optical Engineering, June 1991, Vol. 30, No. 6, p. 749–762;

[4] EP-A-0190519;

[5] FR-A-255 1557;

[6] Specification of Ribbon fiber fusion splicer FSM-20RS, Fujikura Ltd., Tokyo, Japan, Accessory Map ('Fiber holder for ribbon fiber or for arranged fiber').

BRIEF DESCRIPTION OF THE DRAWING

Hereinafter the invention will be more fully described with the help of the description of an exemplary embodiment with reference to a drawing which consists of the following figures.

DESCRIPTION OF AN EXEMPLARY EMBODIMENT

Figure 1:
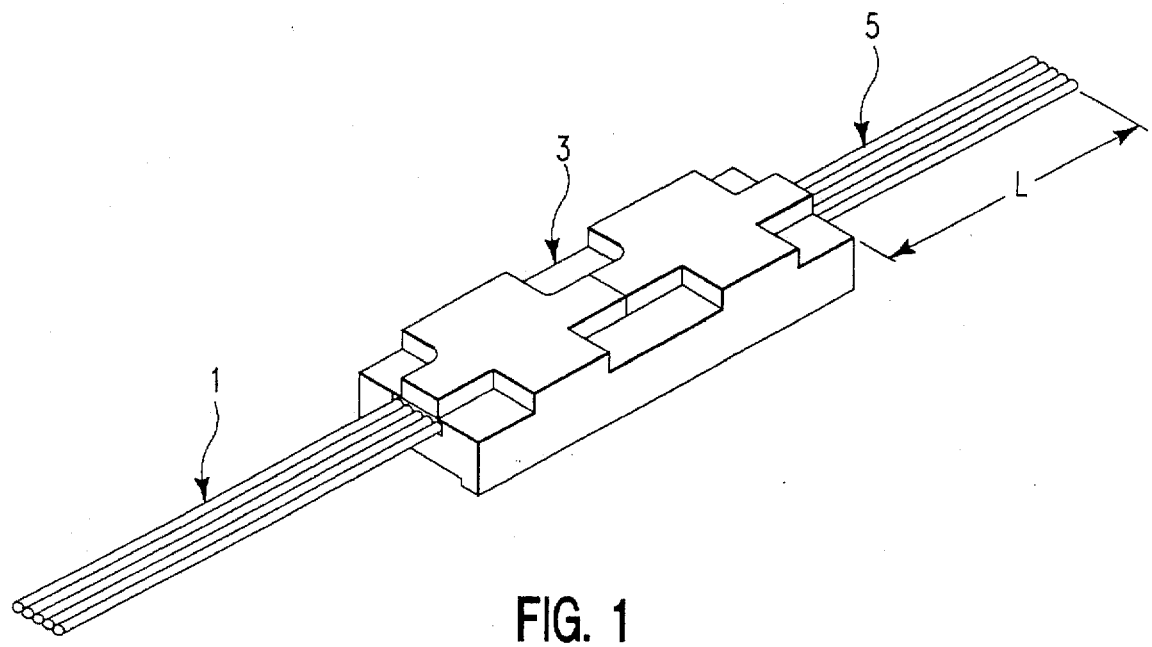
FIG. 1 shows a perspective view of a fiber ribbon received and clamped into a known fiber ribbon holder.

When preparing for welding operations or other operations on a fiber ribbon, it is customary, as is shown in FIG. 1, to receive a respective fiber ribbon 1 and to clamp it into a fiber ribbon holder 3. Such a fiber ribbon holder 3 is known per se, for example through the publication, *Specification of Ribbon Fiber Fusion Splicer FSM-20RS*, Fujikura Ltd., Tokyo, Japan, Accessory Map (Fiber holder for ribbon fiber or for arranged fiber), and will not be discussed here in further detail. To remove the coating material from an end 5 of the fiber ribbon over a length L, the fiber ribbon 1 is received into the fiber ribbon holder 3 such that the end 5 extends out of the fiber ribbon holder 3 over (slightly more than) the length L.

Figure 2:
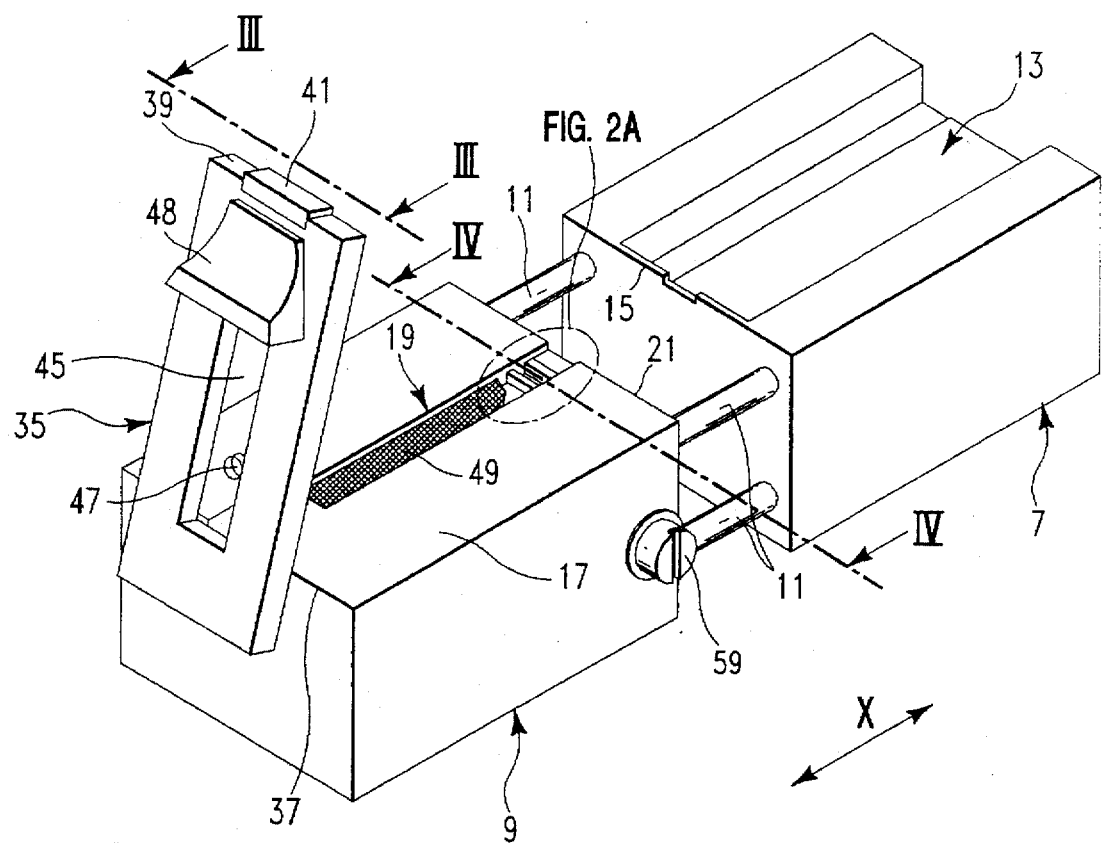
FIG. 2 shows a perspective view of a device of the invention for removing coating material from a fiber ribbon end and FIG. 2A is an enlarged view of a section of FIG. 2.

FIG. 2 shows a perspective view of a device for removing coating material from a fiber ribbon end in accordance with the invention. The device includes of two parts, viz. a receptacle block 7 and a stripper block 9, mutually coupled by a sliding bar system 11. Through the sliding bar system, the receptacle block 7 and the stripper block 9 can be mutually displaced in accordance with a fixed translation direction X over a distance being at least equivalent to the length L from a position in which the receptacle block 7 and the stripper block 9 abut each other. The receptacle block 7 has a receptacle space 13 for receiving a fiber ribbon holder 3 (see FIG. 1) up to and against a stop 15, with a fiber ribbon received in the fiber ribbon holder 3 and running parallel to the translation direction X. At an upper side 17, the stripper block 9 is provided with a groove-like recess 19 for receiving the end 5 of the fiber ribbon 1. The groove-like recess 19, for shortness hereinafter called groove 19, runs from an edge 21 where the upper surface 17 of the stripper block 9 abuts to the receptacle space 13 of the receptacle block 7, and in line with the receptacle space.

The groove 19 includes four parts, partly shown in a detail enlargement A. These parts are, successively seen from the edge 21, a first threshold element 23 formed by the upper side of a first knife block 25 mounted into the stripper block, a first recessed part, hereinafter called exhaust trough 27, a second threshold element 29, and a second recessed part, hereinafter called soaking trough 31. At the position of the first and second threshold elements 23 and 29, respectively, the groove 19 is of identical depth. In the first knife block 25 a first scoring knife 33 is received, extending somewhat above the plane of the first threshold element 23. The groove 19 is longer than the length L of end 5.

A pushing plate 35 is mounted with hinged means, such as for example a ball hinge assembly (not shown), in the stripper block 9 to an end 37, furthermost from the edge 21, of the upper surface 17 in line with the groove 19. On the free end 39 of the pushing plate 35, a second knife block 41 is mounted, which receives a second scoring knife 43 (see FIG. 3). The pushing plate 35 is pivotable around an axis perpendicular to the longitudinal direction of the groove 19 between two extreme positions. The pushing plate 35 is dimensioned such that in one extreme position of the pushing plate 35, hereinafter called the closed position, it can abut on the upper surface 17, with the groove 19 being covered over its entire length up to edge 21 and the second scoring knife 43 being located exactly over the first scoring knife 33. In the other extreme position of the pushing plate 35, hereinafter called the opened position, the groove 19 is uncovered.

The pushing plate 35 receives a window 45 of transparent material, such as quartz, which window 45 is provided with a supply opening 47. These features are implemented such that, with the pushing plate 35 abutting on the upper surface 17 of the stripper block 9, a large part of the soaking trough 31 is visible and the supply opening 47 is located over the soaking trough 31.

Figure 2A:
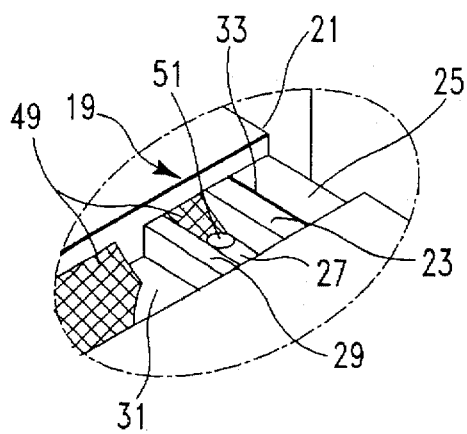

Adjacent to the free end 39 between the second knife block 41 and the window 45 a thumb grip 48 is mounted, with which the pushing plate 35 can be pushed against the surface 17 of the stripper block 9 or lifted. As shown in the enlarged view of FIG. 2A, the depth of the threshold elements 23 and 29 is such that, on pushing the pushing plate 35 in its closed position, a fiber ribbon end positioned in the groove 19 is clamped between the threshold elements 23 and 29, and a corresponding surface part 50 of the pushing plate 35 between the second scoring knife 43 and the window 45; see FIG. 3 for more details. In this connection, the scoring knifes 33 and 43 in their knife blocks 25 and 41, respectively, are adjusted such that, on the upper and under side, only the coating material of the fiber ribbon end is scored and the cladding material is not contacted. The soaking trough 31 and the exhaust trough 27 are provided with a layer of feltlike material 49 with a thickness such that the upper surface of the layer is on approximately the same level as the upper surfaces of both threshold elements 23 and 29, but preferably extends somewhat above it so that the feltlike material is somewhat squeezed by a clamped end.

Figure 4:
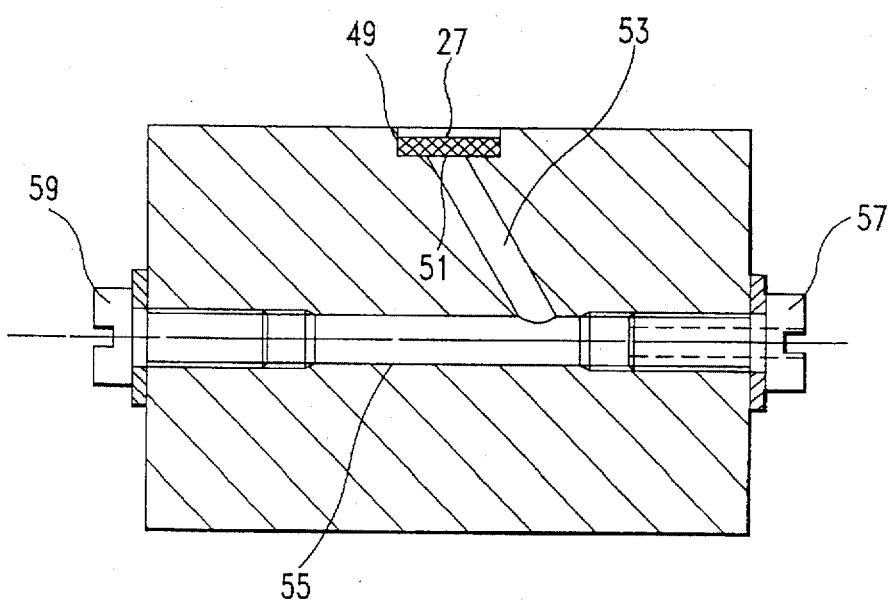
FIG. 4 shows a perspective view of a cross section of the device of FIG. 2 taken along the line IV—IV.

In FIG. 4, a cross-section is shown of the stripper block 9 in accordance with a 20 plane (see line IV—IV in FIG. 2) through the exhaust trough 27 perpendicular to the longitudinal direction of the groove 19. The exhaust trough 27 is provided with an exhaust opening 51 to an exhaust channel 53 which debouches (i.e., emerges or issues) into a feed-through channel S5 running transversely through the stripper block 9. At one end, the feed-through channel SS is provided with a connect nipple 57 for connecting a vacuum pump (not shown), whereas the other end is airtightly sealed with a sealing screw 59.

As coating materials for individual optical fibers or for fiber ribbons thermally hardening silicones, and acrylates and silicones hardening under UV light are known (see for example the Gebizlioglu paper). Suitable softening agents are liquid, preferably somewhat volatile, hydrocarbon compounds. Especially for the acrylates dichloromethane alone, or a half-and-half mixture of dichloromethane and methanol, appear to be very suitable, with a softening period of approx. 30 to 60 seconds.

Hereinafter, the application of the device will be described with such a volatile hydrocarbon compound being used as a softening agent.

Figure 5:
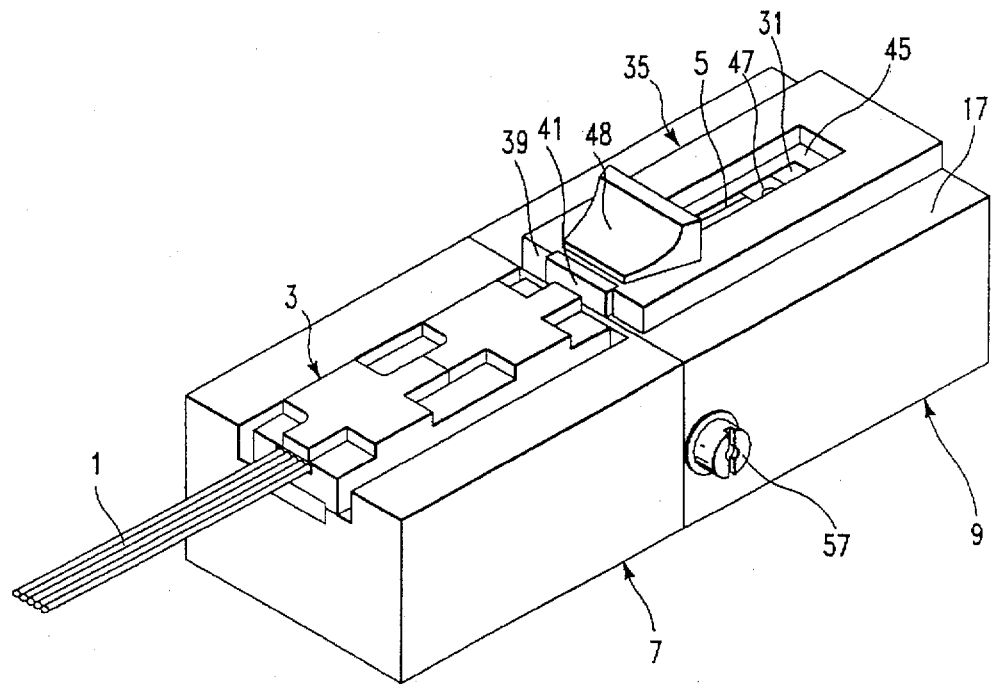
FIG. 5 shows a perspective view of the device of FIG. 2, in which the device receives the fiber ribbon holder of FIG. 1 with a clamped fiber ribbon, in a first stage of the method of with the invention.

A fiber ribbon holder 3 which receives a fiber ribbon 1, such as shown in FIG. 1, is placed into the receptacle block 7 of the device in a position, in which the receptacle block 7 abuts against the stripper block 9, and in the opened position of the pushing plate 35, the end 5 of the fiber ribbon to be stripped is positioned into the groove 19. Subsequently, the pushing plate 35 is brought into the closed position with the help of the thumb grip 48. This stage is shown in FIG. 5. Then, with the help of a pipette or dispenser a measured quantity of the softening liquid is supplied, via the supply opening 47, to the feltlike material layer 49 in the soaking trough 31. The measured quantity is such that the liquid spreads out over the entire length of the soaking trough 31, via the layer of feltlike material 49, and moistens the under side of the clamped end of the fiber ribbon, which starts the softening process of the coating material of the clamped fiber ribbon end. Since the liquid is volatile it easily evaporates out of the feltlike material, so that the remaining space between the window 45 received in the pushing plate 35 and the end 5 of the fiber ribbon 1, which is situated in the groove 19, is filled with a more or less saturated vapour of softening agent, as a result of which the softening process can also take place from the upper side of the fiber ribbon end. As during the softening process the coating material also swells, the progress of the process is visible through the window 45 in the pushing plate 35.

Meanwhile an exhaust pump (not shown) connected to the connect nipple 57 is activated, as a result of which the softening agent, permeating from the soaked felt material 49 in the soaking trough 31 in liquid and/or vapour form into the 5 exhaust trough 27 is exhausted out of the device through the exhaust opening 51 in the exhaust through 27 and via the exhaust channel 53 and the feedthrough channel 55, preferably to a place where it does not constitute danger to operating personnel. Hereby it is prevented that, for example through capillary attraction, the softening agent creeps further between the surface of the threshold elements and the possibly longitudinal ridged surface of the fiber ribbon end, and reaches and attacks the coating material of the fiber ribbon also beyond the point where the scoring knifes score the coating material.

Figure 6:
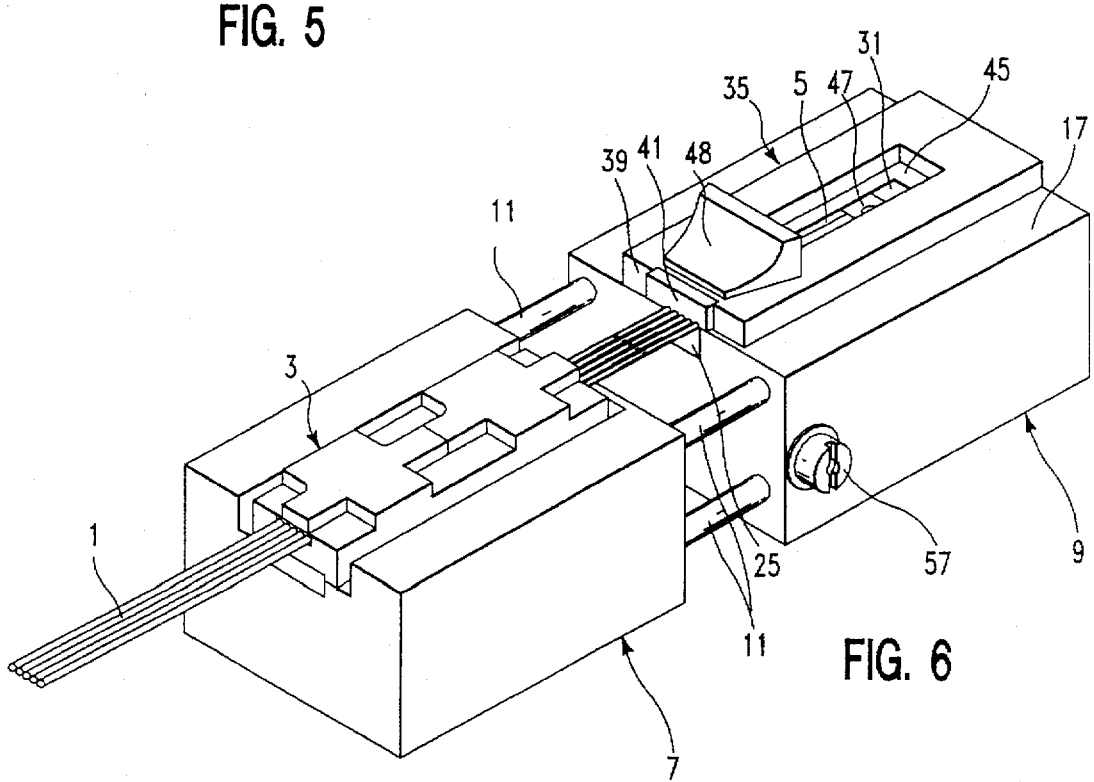
FIG. 6 shows a perspective view of the device of FIG. 2, in which the device receives the fiber ribbon holder of FIG. 1 with a clamped fiber ribbon, in a second stage of the method of the invention.

When the softening process is completed, the pushing plate 35 is pushed in 15 by the thumb grip 48, and subsequently the receptacle block 7 together with the stripper block 9 and the fiber ribbon holder 3 incorporated therein are mutually pulled away over at least a distance L. With this, the fibers in the fiber ribbon end 5 are released from the scoring point out of the coating material which remains clamped in the stripper block 9 as a loose sleeve. This stage is shown in FIG. 6. Subsequently, the fiber ribbon holder is taken out of the receptacle block 9 and the fiber ribbon 1, with the stripped end, is available for further processing. While the receptacle block 7 and stripper block 7 are separated, the exhaust pump preferably remains operative to exhaust the last remains of softening agent. After opening the clamping plate 35, the remaining coating material is removed from the stripper block 9 and the device is available for stripping a further fiber ribbon.

In the figures FIGS. 2, 5 and 6, the window 45 is shown as being mounted into the clamping part 35 such that the window with a surface forms a continuation of the surface part SO. With such a mounting, for promoting a capillary contact attraction of the softening liquid with the surface of a clamped fiber ribbon end, said window surface can be provided with a surface structure, such as a wafer structure or a ridge structure transversely of the longitudinal direction of the soaking trough 31. At the under side, the capillary contact attraction can also be used by providing the bottom of the soaking trough 31 with such a surface structure in replacement of the layer of feltlike material 49. However, only using capillary contact attraction makes the softening process somewhat slower.

Another possibility is to mount the window 45 recessedly into the pushing plate 35, so that over the part of a clamped fiber ribbon end 1 situated under the window 45, a free space is formed. This free space can be filled during the softening process with saturated vapour of softening liquid evaporating out of the feltlike material 49.

In a surroundings where an exhaust pump is not available, but compressed air is, the device of the present invention can also be used. To this end the sealing screw 59 is replaced by a second supply nipple (not shown), to which the compressed air is connected. In the exhaust channel 53, underpressure arises by guiding compressed air through the feed-through channel SS.

Figure 3:
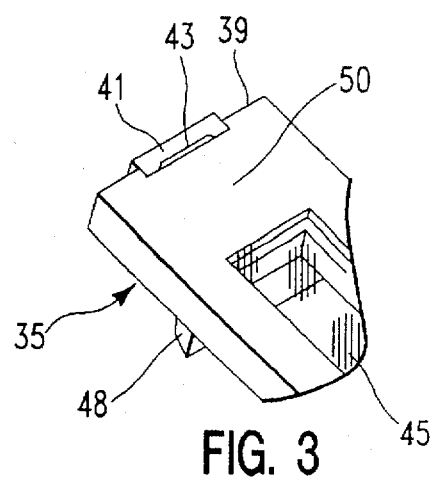
FIG. 3 shows a partial perspective view, in detail, of a part of the device of FIG. 2 in a view direction indicated by arrow III.

A softening device consisting of a device described with reference to the figures FIG. 2 to FIG. 4 inclusive and from which the scoring means, viz. the knife blocks 41 and 25, are omitted can be used in combination with the stripping device discussed in the Mitsubishi reference. In this connection, the softening process occurs in the one device and, after transferring the fiber ribbon, the actual stripping occurs in the other device.

I claim:

1. A device for removing a coating from a length of a fiber ribbon held in a holder, the length of the fiber ribbon from which the coating is to be removed extending from an edge of the holder, the fibers of the fiber ribbon extending in, and defining, a first direction, the device comprising:
   a) a first element having a recess for receiving the holder;
   b) a second element including
      i) a base having a recess extending lengthwise in the first direction and having
         A) a length approximately as long as the length of the fiber ribbon from which the coating is to be removed,
         B) a width at least as wide as a width of the fiber ribbon,
         C) a first end extending perpendicular to the first direction,
         D) a first wall extending perpendicular to the first direction and located opposite the first end of the recess,
         E) a scoring device arranged adjacent to the first wall, and
         F) an exhaust opening defined in the recess of the base, and
      ii) a pushing plate
         A) attached to the base of the second element by means of a hinge at a first end, the hinge being arranged perpendicular to the first direction,
         B) having an opened state and a closed state, and
         C) having a scoring device at a second end, opposite the first end, such that when the pushing plate is in the closed state, the scoring device of the pushing plate is located adjacent to the scoring device of the base; and
   c) a guide, arranged between the first element and second element, for allowing linear motion along the first direction between the first and second elements such that the first and second element may be brought together and separated.

2. The device of claim 1 wherein the guide includes guide bars between the first element and the base of the second element.

3. The device of claim 1 further comprising a solvent absorbing material, arranged in the recess of the base of the second element.

4. The device of claim 3 wherein the solvent absorbing material is arranged over the exhaust opening.

5. The device of claim 1 further comprising a second wall arranged in the recess between the first wall and the first end of the recess and perpendicular to the first direction thereby defining a soaking trough between the first end of the recess and the first wall and defining a second trough between the first and second walls.

6. The device of claim 5 wherein the exhaust opening is located in the second trough, between the first and second walls of the recess.

7. A method for removing coating material from a fiber ribbon end over a predetermined length, comprising steps of:
   receiving and clamping said fiber ribbon end into a holder,
   scoring the coating material on the upper and under side of the fiber ribbon at a point corresponding to said length,
   softening the coating material of said fiber ribbon end over said length by means of a chemical softening agent,
   withdrawing the fiber ribbon out of the holder, with the fiber ribbon end clamped, while softened coating material of the end remains in the holder, wherein the end is received and clamped into a recessed space between two clamping parts forming part of the holder which together form a casing wall around the received end, wherein the softening agent is supplied into the recessed space, with the end received and clamped, through a supply opening in the wall and is brought into contact with the coating material of the fiber ribbon end, and wherein surplus softening agent is exhausted, via an exhaust opening in the wall,
   wherein the surplus softening agent is exhausted by applying a vacuum to the exhaust opening.

* * * * *